United States Patent
Kim et al.

(10) Patent No.: US 9,801,087 B2
(45) Date of Patent: Oct. 24, 2017

(54) METHOD AND APPARATUS FOR TRANSMITTING INFORMATION FOR REPORTING IN WIRELESS COMMUNICATION SYSTEM

(71) Applicant: LG ELECTRONICS INC., Seoul (KR)

(72) Inventors: Kijun Kim, Anyang-si (KR); Hanbyul Seo, Anyang-si (KR); Byounghoon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 10 days.

(21) Appl. No.: 14/383,435

(22) PCT Filed: Mar. 5, 2013

(86) PCT No.: PCT/KR2013/001743
§ 371 (c)(1),
(2) Date: Sep. 5, 2014

(87) PCT Pub. No.: WO2013/133597
PCT Pub. Date: Sep. 12, 2013

(65) Prior Publication Data
US 2015/0043368 A1    Feb. 12, 2015

Related U.S. Application Data

(60) Provisional application No. 61/608,596, filed on Mar. 8, 2012, provisional application No. 61/653,398, filed on May 30, 2012.

(51) Int. Cl.
*H04W 24/10* (2009.01)
*H04B 17/00* (2015.01)
(Continued)

(52) U.S. Cl.
CPC ............ *H04W 24/10* (2013.01); *H04B 7/024* (2013.01); *H04B 7/0417* (2013.01); *H04B 17/00* (2013.01);
(Continued)

(58) Field of Classification Search
None
See application file for complete search history.

(56) References Cited

U.S. PATENT DOCUMENTS 8,897,162 B2 * 11/2014 Lv .................. H04W 24/10
370/252
2003/0032433 A1 * 2/2003 Daniel .............. H04W 72/0486
455/452.1
(Continued)

FOREIGN PATENT DOCUMENTS

WO   WO 2011/145886 A2   11/2011
WO   WO 2012/021047 A2    2/2012

OTHER PUBLICATIONS

Alcatel-Lucent Shanghai Bell et al., "Further consideration on CSI-RS," 3GPP TSG RAN WG1 Meeting #60bis, R1-101855, Beijing, China, Apr. 12-16, 2010, pp. 1-4.
(Continued)

*Primary Examiner* — Hassan Kizou
*Assistant Examiner* — Deepa Belur
(74) *Attorney, Agent, or Firm* — Birch, Stewart, Kolasch & Birch, LLP

(57) ABSTRACT

One embodiment of the present invention relates to a method for a serving cell transmitting information for reporting a terminal measurement and/or reporting channel state information in a wireless communication system, and more specifically, to a method for transmitting information comprising a step of transmitting information to the terminal the measurement report and/or the channel state information
(Continued)

(a)

(b)

report, wherein the information includes a plurality of channel state information-reference signal (CSI-RS) settings, wherein each of the plurality of CSI-RS settings includes information related to a bandwidth from which the CSI-RS is transmitted according to the relevant CSI-RS setting.

14 Claims, 13 Drawing Sheets

(51) Int. Cl.
    *H04B 7/024*     (2017.01)
    *H04L 5/00*     (2006.01)
    *H04B 7/0417*     (2017.01)
    *H04W 52/32*     (2009.01)
    *H04B 17/309*     (2015.01)
    *H04B 7/06*     (2006.01)
    *H04B 17/318*     (2015.01)
    *H04B 17/327*     (2015.01)

(52) U.S. Cl.
    CPC ......... *H04B 17/309* (2015.01); *H04L 5/0053* (2013.01); *H04W 52/325* (2013.01); *H04B 7/0639* (2013.01); *H04B 17/318* (2015.01); *H04B 17/327* (2015.01)

(56) References Cited

U.S. PATENT DOCUMENTS

| | | | |
|---|---|---|---|
| 2011/0216842 A1* | 9/2011 | Zhang | H04L 5/0051 375/260 |
| 2012/0106374 A1* | 5/2012 | Gaal | H04L 5/0048 370/252 |
| 2012/0108254 A1* | 5/2012 | Kwon | H04L 5/0023 455/450 |
| 2012/0182956 A1* | 7/2012 | Liu | H04L 5/001 370/329 |
| 2012/0276916 A1* | 11/2012 | Kazmi | G01S 5/0205 455/452.1 |
| 2012/0329468 A1* | 12/2012 | Chmiel | H04L 5/0007 455/450 |
| 2013/0003788 A1* | 1/2013 | Marinier | H04B 7/024 375/219 |
| 2013/0028182 A1* | 1/2013 | Geirhofer | H04L 5/0048 370/328 |
| 2013/0083681 A1* | 4/2013 | Ebrahimi Tazeh Mahalleh | H04L 5/0057 370/252 |
| 2013/0094384 A1 | 4/2013 | Park et al. | |
| 2013/0208677 A1* | 8/2013 | Lee | H04L 5/0094 370/329 |
| 2013/0322363 A1* | 12/2013 | Chen | H04W 72/042 370/329 |
| 2014/0112303 A1* | 4/2014 | Popovic | H04L 5/0044 370/330 |
| 2014/0219115 A1* | 8/2014 | Etemad | H04W 28/12 370/252 |
| 2014/0349664 A1* | 11/2014 | Pedersen | H04L 5/001 455/450 |
| 2015/0043372 A1* | 2/2015 | Nagata | H04L 5/0057 370/252 |
| 2015/0049621 A1* | 2/2015 | Liu | H04L 5/0048 370/252 |
| 2015/0282036 A1* | 10/2015 | Yi | H04L 5/001 370/332 |
| 2016/0013906 A1* | 1/2016 | Guo | H04L 5/0048 370/329 |
| 2016/0014778 A1* | 1/2016 | Zhou | H04L 5/0044 370/252 |
| 2016/0173208 A1* | 6/2016 | Kuchi | H04W 72/085 375/267 |
| 2017/0026953 A1* | 1/2017 | Wang | H04L 1/0026 |

OTHER PUBLICATIONS

CATT, "Consistent design of CSI-RS for FDD and TDD," 3GPP TSG RAN WG1 Meeting #58bis, R1-094137, Miyazaki, Japan, Oct. 12-16, 2009, pp. 1-3.

ZTE, "Intra-cell CSI-RS allocation pattern," 3GPP TSG RAN WG1 Meeting #60bis, R1-101827, Beijing, China, Apr. 12-16, 2010, pp. 1-5.

* cited by examiner

FIG. 5
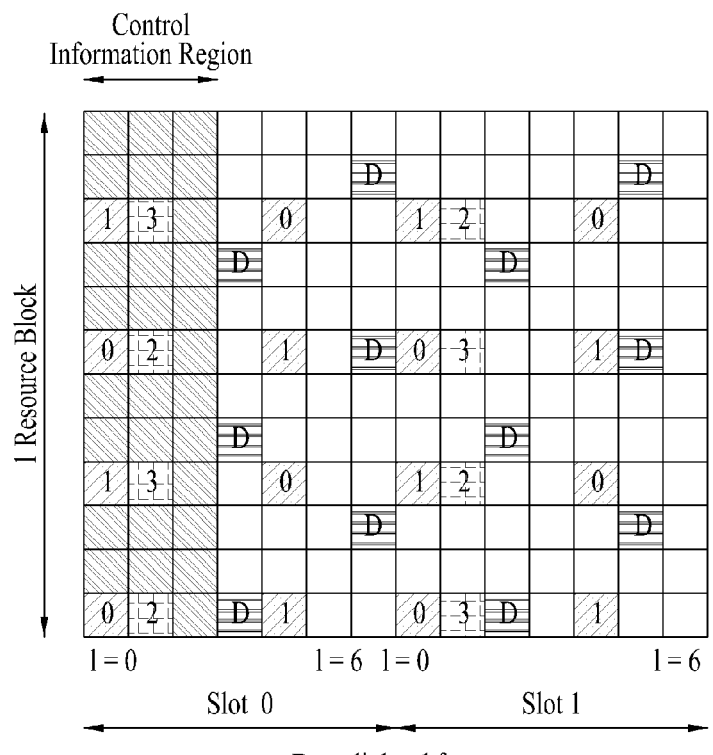
(a)
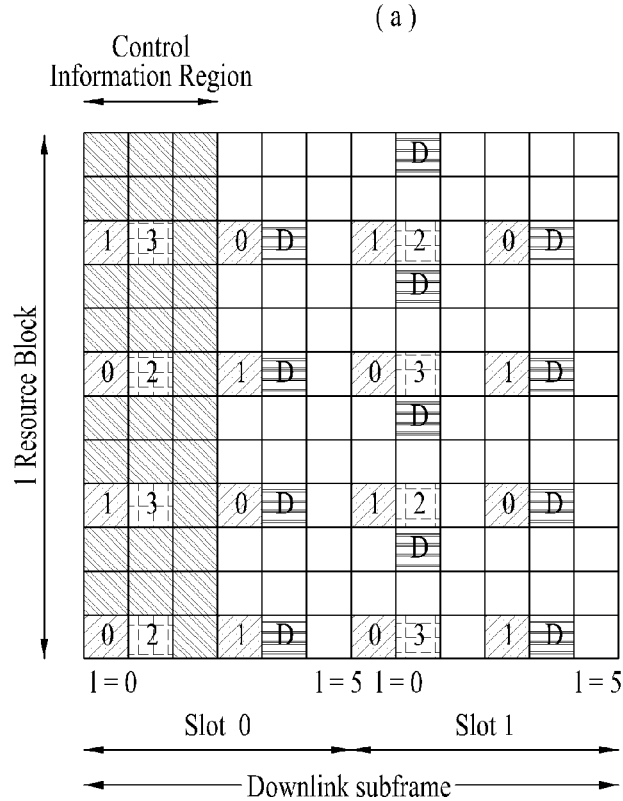
(b)

FIG. 6

McNB : macro eNodeB
PeNB : pico eNodeB
FeNB : femto eNodeB

MUE : macro UE
PUE : pico UE
FUE : femto eNodeB

FIG. 8
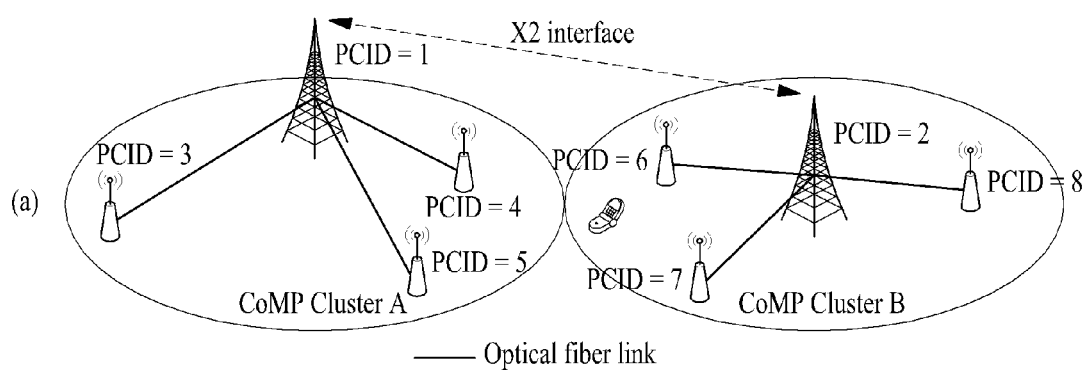
(a)
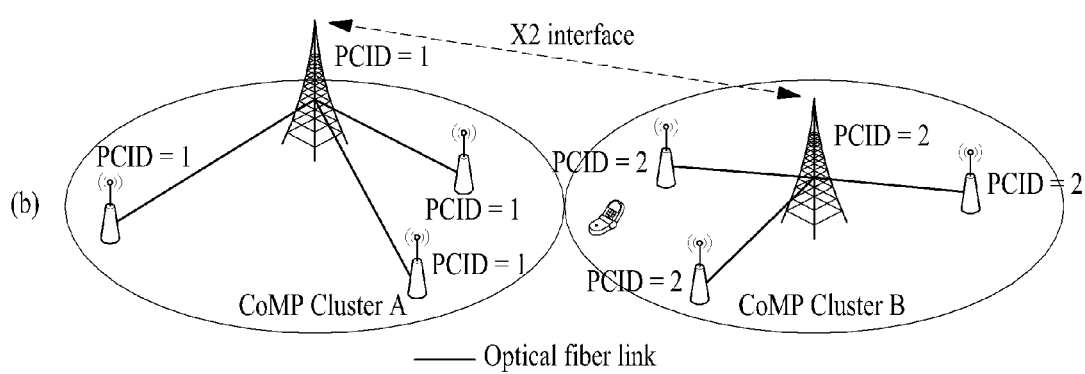
(b)

FIG. 11
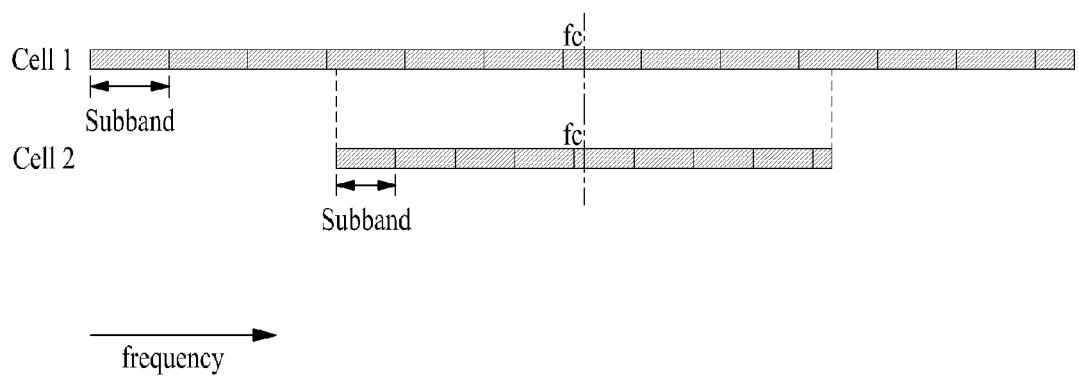
(a)
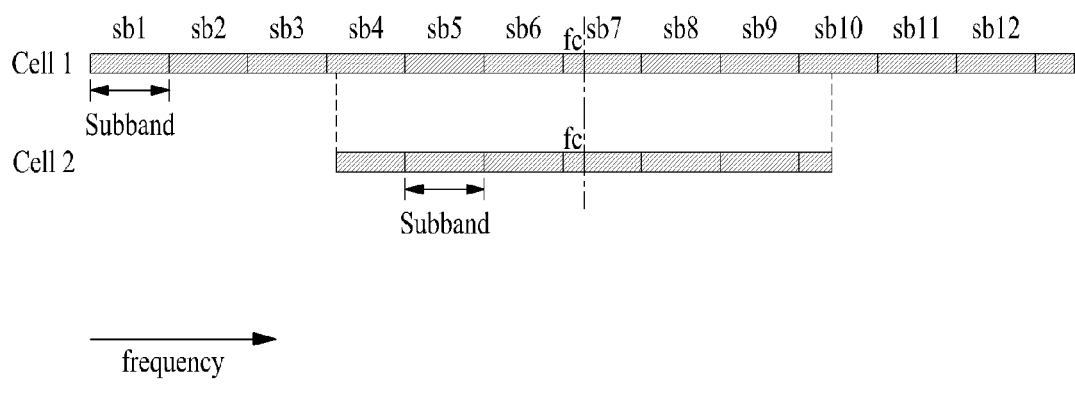
(b)

METHOD AND APPARATUS FOR TRANSMITTING INFORMATION FOR REPORTING IN WIRELESS COMMUNICATION SYSTEM

This application is the National Phase of PCT/KR2013/001743 filed on Mar. 5, 2013, which claims priority under 35 U.S.C. 119(e) to U.S. Provisional Application Nos. 61/608,596 filed on Mar. 8, 2012 and 61/653,398 filed on May 30, 2012, all of which are hereby expressly incorporated by reference into the present application.

TECHNICAL FIELD

The present invention relates to a wireless communication system and, more particularly, to a method and device for transmitting information for measurement report and channel state report.

BACKGROUND ART

Wireless communication systems are widely deployed to provide various kinds of communication content such as voice and data. Generally, these communication systems are multiple access systems capable of supporting communication with multiple users by sharing available system resources (e.g., bandwidth and transmission power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

DISCLOSURE

Technical Problem

An object of the present invention devised to solve the problem lies in a method for transmitting multi CSI-RS resource configuration and relevant information and reporting channel state in order to support coordinated communication between cells having heterogeneous bandwidths.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

According to a first aspect of the present invention, provided herein is a method for transmitting information for at least one of measurement reporting and channel state information reporting of a user equipment (UE) by a serving cell in a wireless communication system, the method including transmitting the information for at least one of measurement reporting and channel state information reporting to the UE, wherein the information includes a plurality of channel state information-reference signal (CSI-RS) configurations, wherein each of the CSI-RS configurations includes information related to a bandwidth for transmission of a CSI-RS corresponding to each of the CSI-RS configurations.

According to a second aspect of the present invention, provided herein is a base station in a wireless communication system including a transmit module, and a processor, wherein the processor transmits information for at least one of measurement reporting and channel state information reporting to the UE, wherein the information includes a plurality of channel state information-reference signal (CSI-RS) configurations, wherein each of the CSI-RS configurations includes information related to a bandwidth for transmission of a CSI-RS corresponding to each of the CSI-RS configurations.

The first and second aspects of the present invention may include the following details.

The information related to the bandwidth may include the number of resource blocks.

The bandwidth for transmission of the CSI-RS may be identical to a bandwidth used by a cell associated with the CSI-RS.

The plurality of CSI-RS configurations may be for designation of at least one of a coordinated multi point (CoMP) management set and a CoMP measurement set.

When the serving cell transmits a zero power CSI-RS for a neighbor cell, the zero power CSI-RS may be transmitted in a bandwidth corresponding to a bandwidth for transmission of a CSI-RS of the neighbor cell.

The serving cell may consider a zero power CSI-RS configuration only when data mapping is performed in a bandwidth corresponding to the bandwidth for transmission of the CSI-RS of the neighbor cell.

According to a third aspect of the present invention, provided herein is a method for reporting channel state information to a serving cell by a user equipment (UE) in a wireless communication system, the method including receiving information for channel state information reporting from the serving cell, determining a sub-band based on the information for channel state information reporting, and reporting the channel state information based on the sub-band, wherein the information for channel state information reporting includes a plurality of channel state information-reference signal (CSI-RS) configurations, wherein each of the CSI-RS configurations includes information related to a bandwidth for transmission of a CSI-RS corresponding to each of the CSI-RS configurations.

According to a fourth aspect of the present invention, provided herein is a user equipment (UE) in a wireless communication system including a receive module, and a processor, wherein the processor receives information for channel state information reporting from the serving cell, determines a sub-band based on the information for channel state information reporting, and reporting the channel state information based on the sub-band, wherein the information for channel state information reporting includes a plurality of channel state information-reference signal (CSI-RS) configurations, wherein each of the CSI-RS configurations includes information related to a bandwidth for transmission of a CSI-RS corresponding to each of the CSI-RS configurations.

The third and fourth aspects of the present invention may include the following details.

The determining may include determining a sub-band based on a virtual bandwidth, and applying the sub-band determined based on the virtual bandwidth to a bandwidth related to at least one CSI-RS to report the channel state information.

When there are two or more CSI-RS configurations to report the channel state information, the UE may report sub-bands corresponding to each other in bandwidths corresponding to the two or more CSI-RS configurations.

The virtual bandwidth may be a largest bandwidth in information related to a plurality of bandwidths corresponding to the plurality of CSI-RS configurations.

The information related to the bandwidth may include the number of resource blocks.

The bandwidth for transmission of the CSI-RS may be identical to a bandwidth used by a cell associated with the CSI-RS.

The plurality of CSI-RS configurations may be for designation of at least one of a coordinated multi point (CoMP) management set and a CoMP measurement set.

Advantageous Effects

According to embodiments of the present invention, measurement reporting and channel state reporting for coordinated communication between cells having heterogeneous bandwidths may be smoothly performed.

It will be appreciated by those skilled in the art that the effects that can be achieved with the present invention are not limited to what has been described above and other advantages of the present invention will be clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention. In the drawings:

FIG. 5 illustrates a reference signal;

FIG. 6 is a diagram illustrating a channel state information reference signal;

FIG. 8 is a diagram illustrating a coordinated multi-point cluster to which an embodiment of the present invention is applicable;

FIGS. 11 and 12 illustrate bandwidths and sub-bands of cells to which an embodiment of the present invention is applicable.

BEST MODE

Figure 1:
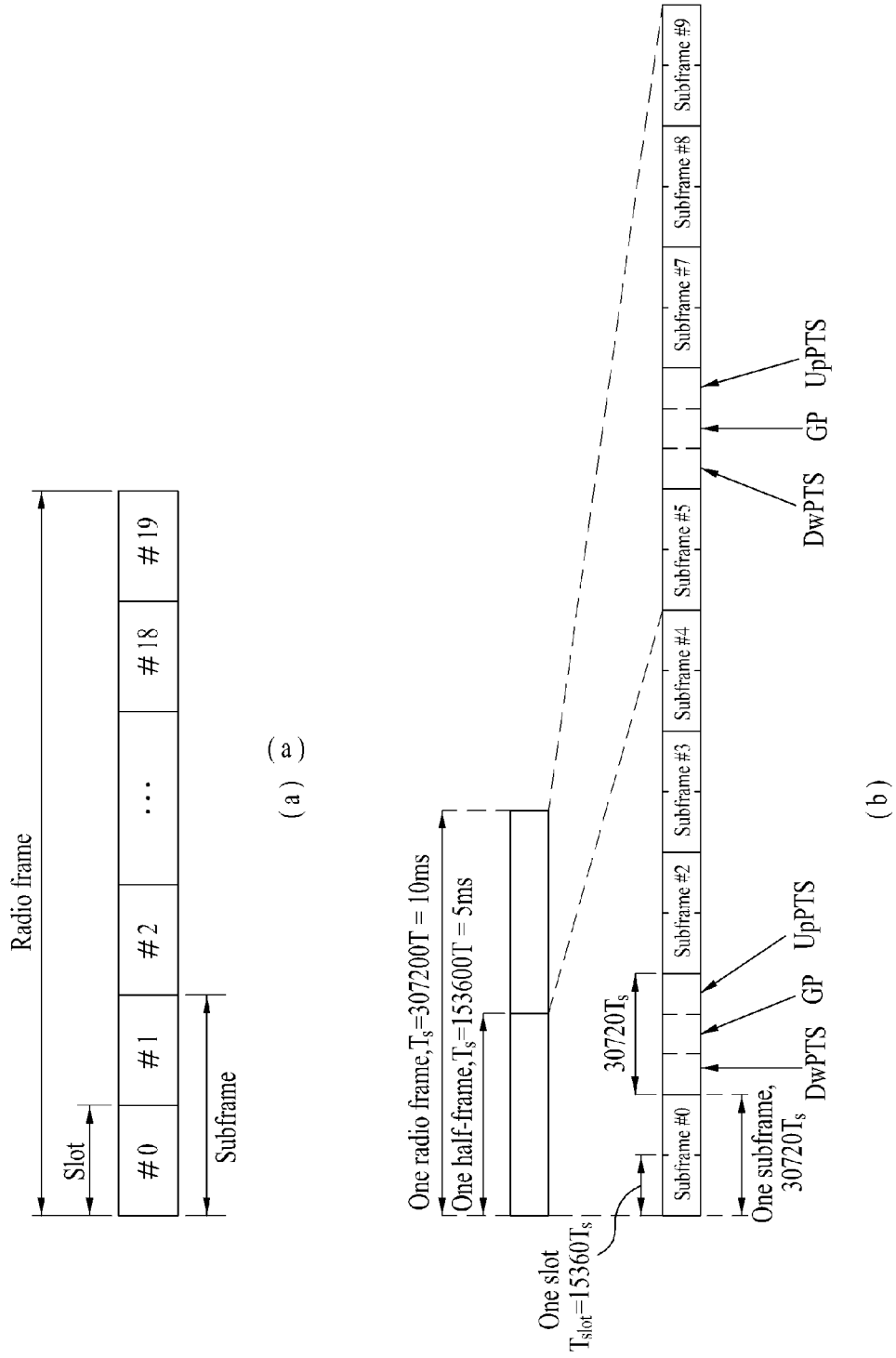
FIG. 1 illustrates a radio frame structure.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described focusing on a data communication relationship between a base station and a terminal. The base station serves as a terminal node of a network over which the base station directly communicates with the terminal. Specific operations illustrated as being conducted by the base station in this specification may be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "mobile station (MS)," "mobile subscriber station (MSS)" and "subscriber station (SS)". The name "cell" adopted in the following descriptions may be applied to transmission/reception points such as a base station (or eNB), a sector, a remote radio head (RRH), and a relay, and may be used a general term to identify a component carrier at a specific transmission/reception point.

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and IEEE 802.16 m advanced (wirelessMAN-OFDMA advanced system). For clarity, the following description focuses on 3GPP LTE and 3GPP LTE-A systems. However, the spirit of the present invention is not limited thereto.

LTE/LET-A Resource Structure/Channel

Hereinafter, a radio frame structure will be described with reference to FIG. 1.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE employs OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol is extended and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

The illustrated radio frame structures are merely examples, and various modifications may be made to the number of subframes included in a radio frame, the number of slots included in a subframe, or the number of symbols included in a slot.

Figure 2:
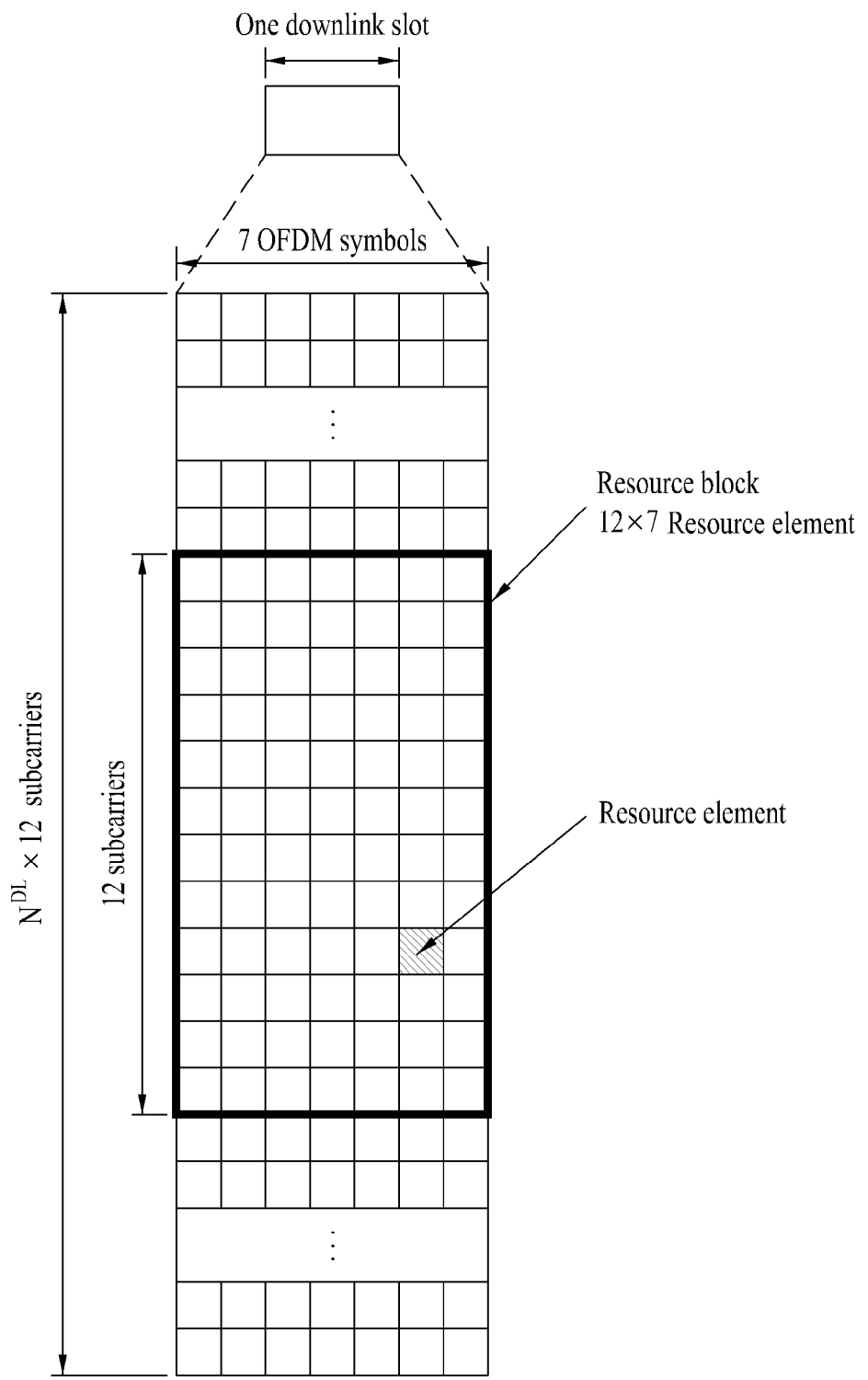
FIG. 2 is a diagram illustrating a resource grid for one downlink (DL) slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number NDL of RBs included in a downlink slot depends on a DL transmission bandwidth. A UL slot may have the same structure as a DL slot.

Figure 3:
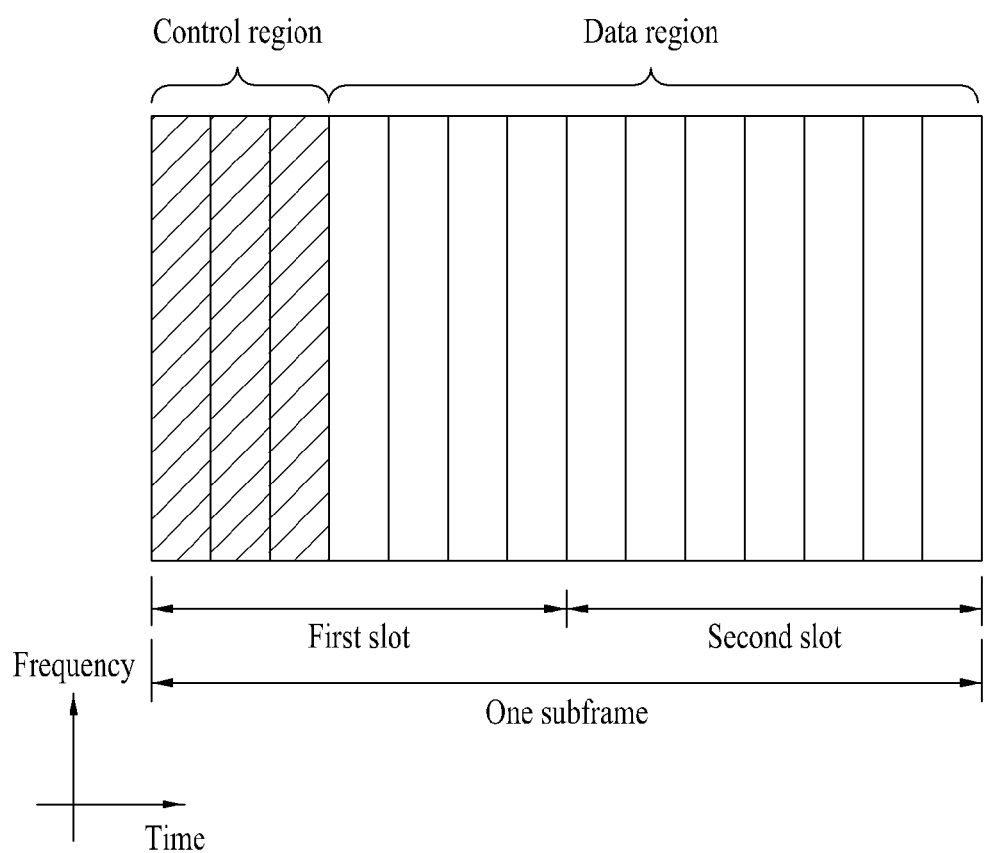
FIG. 3 is a diagram illustrating a DL subframe structure.

FIG. 3 illustrates a DL subframe structure. Up to the first three OFDM symbols of the first slot in a DL subframe are used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted in the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about a UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging radio network temporary identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
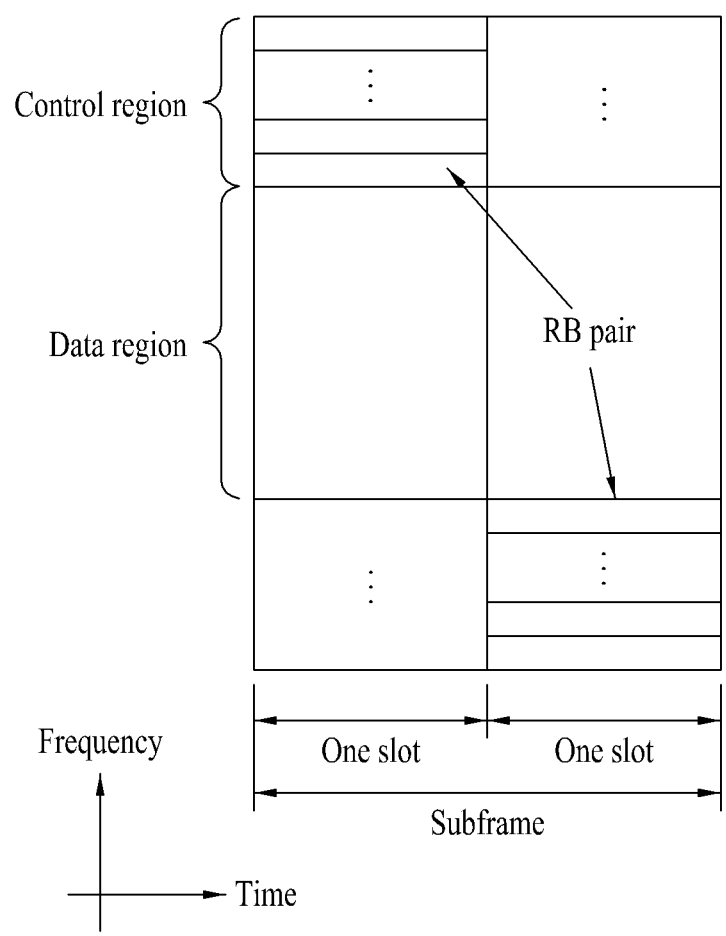
FIG. 4 is a diagram illustrating an uplink (UL) subframe structure.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

Reference Signal (RS)

In transmitting packets in a wireless communication system, the packets are transmitted over a radio channel, and therefore signal distortion may occur in the transmission process. For a receiver to receive the correct signal in spite of signal distortion, the received distorted signal should be corrected using channel information. In detecting the channel information, a signal which is known to both the transmitter and the receiver is transmitted and the degree of distortion of the signal received over the channel is used to detect the channel information. This signal is referred to as a pilot signal or a reference signal.

In the case in which data is transmitted and received using multiple antennas, a channel state between a transmit antenna and a receive antenna needs to be identified to receive a correct signal. Accordingly, a separate RS is needed for each transmit antenna and, more particularly, for each antenna port.

RSs may be divided into an UL RS and a DL RS. In the current LTE system, the UL RSs include:

i) a demodulation-reference signal (DM-RS) for channel estimation for coherent demodulation of information transmitted over a PUSCH and a PUCCH; and ii) a sounding reference signal (SRS) for measuring UL channel quality at frequencies of different networks in the BS.

The DL RSs include:

i) a cell-specific reference signal (CRS) shared by all UEs in a cell;

ii) a UE-specific reference signal for a specific UE;

iii) a demodulation-reference signal (DM-RS) transmitted for coherent demodulation in the case of transmission of a PDSCH;

iv) a channel state information-reference signal (CSI-RS) for delivering channel state information (CSI) in the case of transmission of a DL DMRS;

v) a multimedia broadcast single frequency network (MBSFN) reference signal transmitted for coherent demodulation of a signal transmitted in an MBSFN mode, and vi) a positioning reference signal used to estimate geographic position information of a UE.

The RSs may be broadly divided into two reference signals according to the purposes thereof. There are an RS used to acquire channel information and an RS used for data demodulation. Since the former is used when the UE acquires channel information on DL, this RS should be transmitted over a wide band and even a UE which does not receive DL data in a specific subframe should receive the RS. This RS is also applied to situations such as handover. The latter RS is sent by the BS along with a resource on DL. The UE may receive the RS to perform channel measurement to implement data modulation. This RS should be transmitted in a region in which data is transmitted.

The CRS is used for acquisition of channel information and for data demodulation, and the UE-specific RS is used only for data demodulation. The CRS is transmitted in every subframe in a wide band and RSs for up to four antenna ports are transmitted according to the number of transmit antennas of the BS.

For example, if the number of transmit antennas of the BS is 2, CRSs for antenna ports #0 and #1 are transmitted. If the number of transmit antennas of the BS is 4, CRSs for antenna ports #0 to #3 are respectively transmitted.

FIG. 5 is a diagram illustrating a pattern in which CRSs and DRSs defined in a legacy 3GPP LTE system (e.g., Release-8) are mapped to resource block (RB) pairs. A downlink RB pair, as a unit to which an RS is mapped, may be represented as a unit of one subframe in the time domain times 12 subcarriers in the frequency domain. That is, one RB pair has a length of 14 OFDM symbols for a normal CP (FIG. 5($a$)) and a length of 12 OFDM symbols for an extended CP (FIG. 5($b$)).

FIG. 5 shows locations of RSs on RB pairs in a system in which the BS supports four transmit antennas. In FIG. 5, resource elements (REs) denoted by "0", "1", "2" and "3" represent the locations of the CRSs for antenna port indexes 0, 1, 2 and 3, respectively. In FIG. 5, REs denoted by "D" represent locations of the DMRSs.

Channel State Information-RS (CSI-RS)

The CSI-RS, which is designed for the LTE-A system supporting up to eight antenna ports on downlink, is a reference signal intended for channel measurement. The CSI-RS is different from the CRS which is intended for channel measurement and data demodulation. Accordingly, the CSI-RS does not need to be transmitted in every subframe, unlike the CRS. The CSI-RS is used in transmission mode 9, and the DMRS is transmitted for data demodulation.

More specifically, the CSI-RS may be transmitted through antenna ports 1, 2, 4, and 8. When one antenna port is used, it may be antenna port #15. When two antenna ports are used, they may be antenna ports #15 and #16. When four antenna ports are used, they may be antenna ports #15 to #18. When eight antenna ports are used, they may be antenna ports #15 to #22.

A CSI-RS may be generated using Equation 1 given below.

$$r_{l,n_s}(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, N_{RB}^{max,DL} - 1$$

Equation 1

Herein, $r_{l,n_s}(m)$ denotes a generated CSI-RS, $c(i)$ denotes a pseudo random sequence, $n_s$ denotes the slot number, $l$ denotes an OFDM symbol, and $N_{RB}^{max,DL}$ denotes the maximum number of RBs of a DL bandwidth.

The CSI-RS generated through Equation 1 may be mapped to an RE for each antenna port, using Equation 2.

$$a_{k,l}^{(p)} = w_{l''} \cdot r_{l,n_s}(m')$$
$$k = k' + 12m +$$

Equation 2

-continued $$l = l' + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 2, k' and l' may be determined according to CSI-RS configurations as shown in Table 1.

Figure 6:
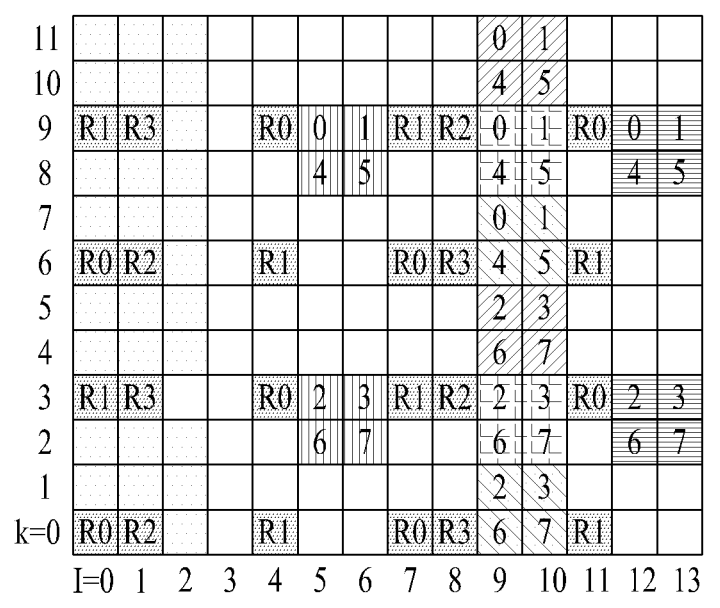

For a specific CSI-RS according to Equation 2 and Table 1, mapping to REs is performed for each antenna port. FIG. 6 shows mapping of CSI-RSs for each antenna port as described above. In FIG. 6, R0 to R3 respectively represent mapping of CRSs to antenna ports, and the number indications represent mapping of CSI-RSs to antenna ports. For example, REs indicated by numbers 0 and 1 represent mapping of a CSI-RS corresponding to antenna port 0 or 1. In this case, CSI-RSs corresponding to two antenna ports are mapped to the same RE, and may be distinguished by different orthogonal codes.

Next, as described above, the CSI-RS may be transmitted in a specific subframe rather than in every subframe. Specifically, the CSI-RS may refer to CSI-RS subframe configurations as listed in Table 2 given below, and be transmitted in a subframe satisfying Equation 3.

TABLE 2

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS} - 5$ |
| 15-34 | 20 | $I_{CSI-RS} - 15$ |
| 35-74 | 40 | $I_{CSI-RS} - 35$ |
| 75-154 | 80 | $I_{CSI-RS} - 75$ |

$$(10n_f + \lfloor n_s/2 \rfloor - \Delta_{CSI-RS}) \mod T_{CSI-RS} = 0 \qquad \text{Equation 3}$$

In Table 2, $T_{CSI-RS}$ denotes the period for transmission of a CSI-RS, $\Delta_{CSI-RS}$ is an offset value, $n_f$ denotes a system frame number, and $n_s$ denotes a slot number.

TABLE 1

| | | Number of CSI reference signals configured | | | | | |
|---|---|---|---|---|---|---|---|
| | CSI reference signal | 1 or 2 | | 4 | | 8 | |
| | configuration | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

The CSI-RS may be signaled to a UE as a CSI-RS configuration information element, as shown in Table 3.

TABLE 3

```
CSI-RS-Config-r10 ::=         SEQUENCE {
    csi-RS-r10                    CHOICE {
        release                       NULL,
        setup                         SEQUENCE {
            antennaPortsCount-r10         ENUMERATED {an1,
                                          an2, an4, an8},
            resourceConfig-r10            INTEGER (0..31),
            subframeConfig-r10            INTEGER (0..154),
            p-C-r10                       INTEGER (-8..15)
        }
    }
                                  OPTIONAL,      -- Need ON
    zeroTxPowerCSI-RS-r10         CHOICE {
        release                       NULL,
        setup                         SEQUENCE {
            zeroTxPowerResourceConfigList-r10   BIT STRING (SIZE
                                                (16)),
            zeroTxPowerSubframeConfig-r10       INTEGER (0..154)
        }
    }
                                  OPTIONAL       -- Need ON
}
```

In Table 3, 'antennaPortsCount' carries the number (selected among 1, 2, 4, and 8) of antennas through which the CSI-RS is transmitted, 'resourceConfig' carries an RE in which the CSI-RS is positioned in an RB in time-resource frequency, and 'subframeConfig' carries a subframe in which the CSI-RS is transmitted and a CSI-RS EPRE value for PDSCH EPRE. Additionally, the eNB delivers information about a zero power CSI-RS.

In CSI-RS Config, 'resourceConfig' indicates the position at which the CSI-RS is transmitted. This parameter indicates accurate positions of a symbol and a carrier in an RB according to CSI-RS configuration numbers of Table 1 represented as 0 to 31.

Channel State Information (CSI) Feedback

MIMO schemes may be classified into an open-loop MIMO scheme and a closed-loop MIMO scheme. In the open-loop MIMO scheme, a MIMO transmitter performs MIMO transmission without receiving CSI feedback from a MIMO receiver. In the closed-loop MIMO scheme, the MIMO transmitter receives CSI feedback from the MIMO receiver and then performs MIMO transmission. In the closed-loop MIMO scheme, each of the transmitter and the receiver may perform beamforming based on CSI to achieve a multiplexing gain of MIMO transmit antennas. To allow the receiver (e.g., a UE) to feed back CSI, the transmitter (e.g., an eNB) may allocate a UL control channel or a UL-SCH to the receiver.

The CSI feedback may include a rank indicator (RI), a precoding matrix index (PMI), and a channel quality indicator (CQI).

The RI is information about a channel rank. The channel rank indicates the maximum number of layers (or streams) that may carry different information in the same time-frequency resources. Since the rank is determined mainly according to long-term fading of a channel, the RI may be fed back in a longer period than the PMI and the CQI.

The PMI is information about a precoding matrix used for transmission of a transmitter and has a value reflecting the spatial characteristics of a channel. Precoding refers to mapping transmission layers to transmit antennas. A layer-antenna mapping relationship may be determined according to a precoding matrix. The PMI is the index of an eNB precoding matrix preferred by the UE based on a metric such as signal-to-interference-plus-noise ratio (SINR), etc. In order to reduce the feedback overhead of precoding information, the transmitter and the receiver may pre-share a codebook including multiple precoding matrices and only an index indicating a specific precoding matrix in the codebook may be fed back.

In a system supporting an extended antenna configuration (e.g. an LTE-A system), additional acquisition of multi-user (MU)-MIMO diversity using an MU-MIMO scheme is considered. In the MU-MIMO scheme, when an eNB performs downlink transmission using CSI fed back by one UE among multiple users, it is necessary to prevent interference with other UEs from occurring because there is an interference channel between UEs multiplexed in the antenna domain. Accordingly, CSI of higher accuracy than CSI in a single-user (SU)-MIMO scheme should be fed back in order to correctly perform MU-MIMO operation.

A new CSI feedback scheme may be adopted by modifying conventional CSI including an RI, a PMI, and a CQI so as to more accurately measure and report CSI. For example, precoding information fed back by the receiver may be indicated by a combination of two PMIs. One of the two PMIs (a first PMI) has a long-term and/or wideband property, and may be referred to as W1. The other PMI (a second PMI) has a short-term and/or subband property, and may be referred to as W2. A final PMI may be determined by a combination (or a function) of W1 and W2. For example, if the final PMI is denoted by W, W=W1*W2 or W=W2*W1.

The CQI is information indicating channel quality or channel strength. The CQI may be expressed as an index corresponding to a predetermined modulation and coding scheme (MCS) combination. That is, a CQI index that is fed back indicates a corresponding modulation scheme and code rate. In general, the CQI has a value reflecting a reception SINR that can be achieved when an eNB configures a spatial channel using a PMI.

In LTE/LTE-A, a CSI reference resource related to channel measurement for CSI feedback/report described above is defined. In the frequency domain, the CSI reference resource is defined as a group of physical RBs corresponding to a frequency band associated with a calculated CQI. In the time domain, the CSI reference resource is defined as n-nCQ- I_ref. herein, n indicates a subframe in which the CSI is transmitted/reported, and nCQI_ref indicates: i) the least value corresponding to a valid subframe among the values greater than or equal to 4 in the case of periodic CSI report, ii) a valid subframe corresponding to a subframe in which a CSI request in an uplink DCI format is transmitted in the case of aperiodic CSI reporting; or iii) 4 in the case of a CSI request in the random access response grant in aperiodic CSI reporting. The valid subframe means that it satisfies the following conditions: the subframe should be a DL subframe for the UE; the subframe should not be an MBSFN subframe in modes other than transmission mode 9 environment with a frequency; the DwPTS should be longer than a certain size in TDD; the subframe should not be included in a measurement gap set for the UE; and if a CSI subframe set is configured for the UE in periodic CSI reporting, the subframe should be an element of the CSI subframe set. As described below, the CSI subframe set is for restricted measurement. The CSI subframe set $c_{CSI,0}$, $c_{CSI,1}$) may be configured for the UE by a higher layer. A CSI reference resource may be included in one of two subframe sets ($c_{CSI,0}$ and $c_{CSI,1}$. For simplicity, $c_{CSI,0}$ is denoted by C0, $c_{CSI,1}$ is denoted by C1), but not in both sets.

Heterogeneous Deployments

Figure 7:
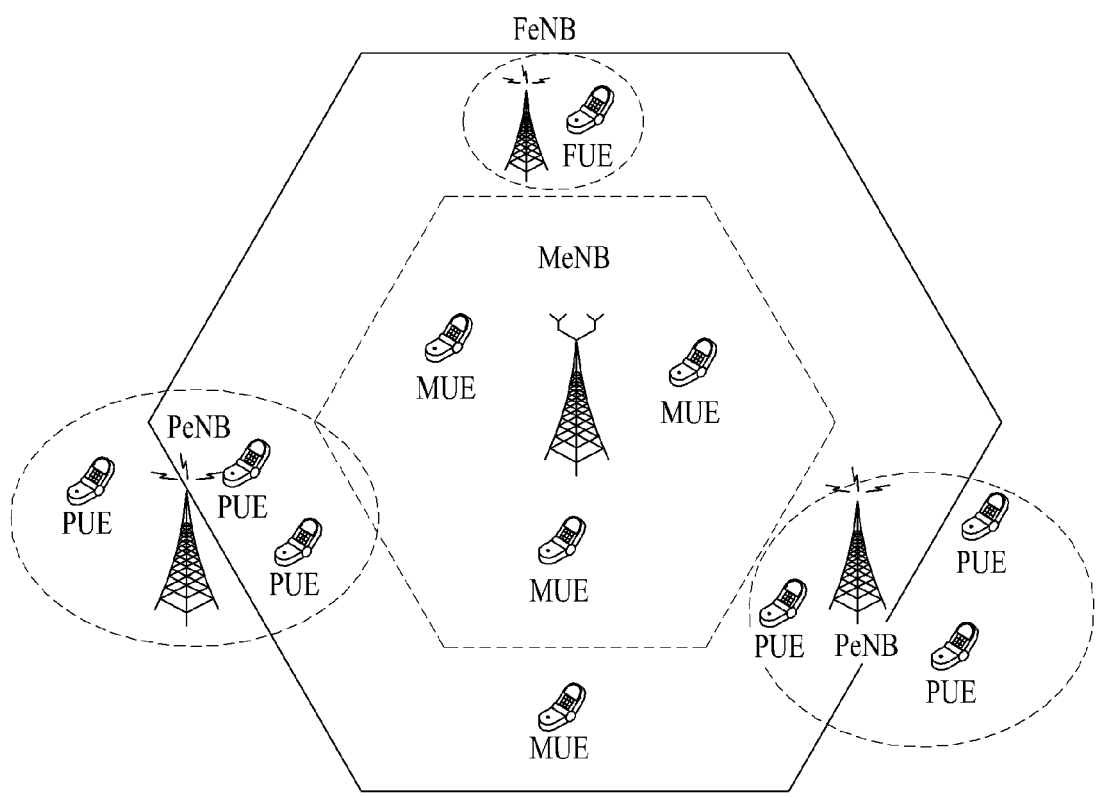
FIG. 7 is a diagram illustrating a heterogeneous network environment.

FIG. 7 illustrates a heterogeneous network wireless communication system including a macro eNB (MeNB) and micro eNBs (PeNBs or FeNBs). The term "heterogeneous network" refers to a network in which an MeNB and a PeNB or FeNB coexist even when they use the same radio access technology (RAT).

The MeNB is a normal eNB of a wireless communication system having wide coverage and high transmission power. The MeNB may be referred to as a macro cell.

The PeNB or FeNB may be referred to as, for example, a micro cell, pico cell, femto cell, home eNB (HeNB), relay, etc. (the exemplified PeNB or FeNB and MeNB may be collectively referred to as transmission points). The PeNB or FeNB, a micro version of the MeNB, can independently operate while performing most functions of the MeNB. The PeNB or FeNB is a non-overlay type eNB that may be overlaid in an area covered by the MeNB or in a shadow area that is not covered by the MeNB. The PeNB or FeNB may cover a smaller number of UEs while having a narrower coverage and lower transmission power than the MeNB.

A UE (hereinafter, referred to as a macro-UE (MUE)) may be directly served by the MeNB or a UE (hereinafter, referred to as a micro-UE) may be served by the PeNB or FeNB. In some cases, a PUE present in the coverage of the MeNB may be served by the MeNB.

PeNBs or FeNBs may be classified into two types according to whether UE access is limited.

The first type is an open access subscriber group (OSG) or non-closed access subscriber group (non-CSG) eNB and corresponds to a cell that allows access of the existing MUE or a PUE of a different PeNB. The existing MUE can handover to the OSG type eNB.

The second type is a CSG eNB which does not allow access of the existing MUE or a PUE of a different PeNB. Accordingly, handover to the CSG eNB is impossible.

Coordinated Multi-Point (CoMP)

To satisfy enhanced system performance requirements for the 3GPP LTE-A system, CoMP transmission and reception technology (also called co-MIMO, collaborative MIMO or network MIMO) has been proposed. The CoMP technology may increase the performance of UEs located at a cell edge and the average sector throughput.

In a multi-cell environment with a frequency reuse factor of 1, the performance of a UE located at a cell edge and average sector throughput may be lowered due to inter-cell interference (ICI). To attenuate ICI, the legacy LTE/LTE-A system has adopted a simple passive technique such as fractional frequency reuse (FFR) based on UE-specific power control such that a UE located at a cell edge may have appropriate throughput performance in an environment constrained by interference. However, attenuating the ICI or reusing ICI as a desired signal for the UE may be more desirable than lowering use of frequency resources per cell. To this end, a CoMP transmission technique may be employed.

CoMP schemes applicable to downlink may be broadly classified into joint processing (JP) and coordinated scheduling/beamforming (CS/CB).

According to the JP scheme, data can be used by each transmission point (eNB) of a CoMP cooperation unit. The CoMP cooperation unit refers to a set of eNBs used for a CoMP transmission scheme. The JP scheme may be further divided into joint transmission and dynamic cell selection.

Joint transmission refers to a technique of simultaneously transmitting PDSCHs from a plurality of transmission points (a part or the entirety of a CoMP cooperation unit). That is, a plurality of transmission points may simultaneously transmit data to a single UE. With the joint transmission scheme, the quality of a received signal may be coherently or non-coherently improved, and interference with other UEs may be actively eliminated.

Dynamic cell selection is a technique of transmitting a PDSCH from one transmission point (of a CoMP cooperation unit) at a time. That is, one transmission point transmits data to a single UE at a given time point, while the other transmission points in the CoMP cooperation unit do not transmit data to the UE at the time point. A transmission point to transmit data to a UE may be dynamically selected.

Meanwhile, in the CS/CB scheme, CoMP cooperation units may cooperatively perform beamforming for data transmission to a single UE. While data is transmitted to the UE only from a serving cell, user scheduling/beamforming may be determined through coordination of cells of the CoMP cooperation units.

In the case of uplink, CoMP reception refers to reception of a signal transmitted through cooperation among a plurality of geographically separated transmission points. CoMP schemes applicable to uplink may be classified into joint reception (JR) and coordinated scheduling/beamforming (CS/CB).

The JR scheme indicates that a plurality of reception points receives a signal transmitted through a PUSCH. The CS/CB scheme indicates that only one point receives a PUSCH, and user scheduling/beamforming is determined by coordination of the cells of the CoMP unit.

With a CoMP system as above, multi-cell base stations may jointly support data for a UE. In addition, the base stations may simultaneously support one or more UEs using the same radio frequency resources, thereby increasing system performance. Moreover, a base station may perform space division multiple access (SDMA) based on CSI between the UE and the base station.

In the CoMP system, a serving eNB and one or more cooperative eNBs are connected to a scheduler over a backbone network. The scheduler may receive channel information about the channel states between each UE and cooperative eNBs measured and fed back by the cooperative eNBs over the backbone network, and operate based on the channel information. For example, the scheduler may schedule information for a cooperative MIMO operation for the serving eNB and the one or more cooperative eNBs. That is, the scheduler may directly give each eNB a command to perform the cooperative MIMO operation.

As noted from the above description, it can be said that the CoMP system operates as a virtual MIMO system by grouping a plurality of cells into one group. Basically, the CoMP system may adopt a MIMO communication scheme employing multiple antennas.

FIG. 8 illustrates a CoMP cluster. A CoMP cluster refers to a CoMP cooperation unit mentioned above. FIG. 8(a) illustrates a case in which cells in a CoMP cluster use different physical cell IDs (PCIDs), and FIG. 8(b) illustrates a case in which cells in a CoMP cluster use the same PCID. Even in the case that the cells use the same PCID in a CoMP cluster, the CoMP clusters (CoMP clusters A, B in FIG. 8(b)) may use different PCIDs, and the cells in a single cluster may be configured in the form of a distributed antenna of an eNB or an RRH by sharing a PCID. In a variation, some of the cells in a cluster may share a PCID.

If the cells share the PCID, all the cells having the same PCID may transmit a common signal such as a primary synchronization signal (PSS)/secondary synchronization signal (SSS), a CRS, a PBCH, or a CRS-based PDCCH/PDSCH at the same time. Thereby improving quality of received signals and removing the communication shadow area. Alternatively, some cells having higher transmission power than may transmit a common signal among the cells having the same PCID, and the other cells may not transmit a common signal. However, in the case of unicast data transmission through a CSI-RS, a UE-specific RS and a UE-specific RS-based PDSCH, each cell may individually perform transmission, and have a cell splitting gain.

Measurement/Measurement Report

A measurement report is used for one or more of many techniques (handover, random access, cell search, etc.) designed to ensure mobility of UEs. Since the measurement report needs a certain degree of coherent demodulation, a UE may perform measurement after acquiring synchronization and physical layer parameters, except for measurement of a received signal strength. The measurement report covers radio resource management (RRM) measurement such as reference signal received power (RSRP), received signal strength indicator (RSSI) and reference signal received quality (RSRQ) measurement, which are measurements of signal strengths or signal strengths to total reception power of a serving cell and neighbor cells, and radio link monitoring (RLM) measurement, which measures a quality of a link with a serving cell to determine whether a radio link failure has occurred.

RSRP is a linear average of power distribution of an RE in which a CRS is transmitted on downlink.

RSSI is a linear average of powers received by a UE. An OFDM symbol including an RS for antenna port 0 is measured for RSSI. RSSI is a measured value including interference from neighbor cells and noise power. If higher layer signaling indicates a specific subframe for RSRQ measurement, the RSSI is measured for all OFDM symbols included in the indicated subframe.

RSRQ is a value measured in the form of N×RSRP/RSSI, where N is the number of RBs of a bandwidth in measurement of the RSSI.

As can be seen from the definition of RSRP given above, it is basically assumed that measurement reporting is performed using CRS. However, in the case in which cells share one PCID as shown in FIG. 8(b), the cells having the same PCID cannot be distinguished from each other based on the CRS. Accordingly, RRM cannot be performed for each of the cells using the measurement report including RSRP/RSRQ based on the CRS alone. Therefore, if the cells share one PCID, RSRP/RSRQ measurement reporting may be additionally performed based on CSI-RSs which are individually transmitted. To increase reception accuracy in receiving a CSI-RS of a specific cell, neighbor cells do not perform signal transmission in an RE in which the CSI-RS is transmitted. Thereby, measurement may be more accurately performed even though the frequency of CSI-RS transmission is lower than in the case of CRS. Therefore, by performing CRS-based RSRP/RSRQ measurement reporting and CSI-RS RSRP/RSRQ measurement reporting together regardless of whether or not the cells have different PCIDs, accuracy of RRM for a network may be enhanced.

Transmission of CSI-RS from cell is also intended for CSI feedback that a UE performs to assist scheduling of an eNB which determines a rank, a predcoing matri, and a modulation and coding scheme (MCS) (or CQI) that may be used in DL data transmission between a cell and the UE. In a CoMP transmission scheme, the UE need to feed back CSI even for downlink with a cooperative cell other than a serving cell. Feeding back of CSI for all the cells in a CoMP cluster to which the serving cell of the UE belongs results in excessive overhead. Therefore, CSI may be fed back only for some cells in the CoMP cluster which are worth coordinated scheduling and coordinated data transmission. To determine a CoMP measurement set for a specific UE, RSRP may be configured by selecting cells whose levels are higher than or equal to a certain level. To this end, the UE performs RSRP measurement reporting for the cells in a CoMP cluster to which the UE belongs. Alternatively, an eNB may designate, as a CoMP management set, configurations of the CSI-RSs for which the UE needs to perform RSRP or RSRQ measurement and inform the UE of the designated configurations. Then, the UE may perform RSRP or RSRQ measurement for the CSI-RSs transmitted from the cells belonging to the designated CoMP management set, and when the result of measurement meets a specific condition, the UE may perform reporting.

Additionally, in order to allow for ICIC between CoMP clusters, the UE performs RSRP measurement and reporting for the cells in a neighbor CoMP cluster such that the network and the UE identify a cell of the neighbor CoMP cluster that applies strong interference to the UE and a cell to which the UE applies strong UL interference.

Along with CRS-based RSRP/RSRQ measurement reporting for mobility management of, for example, handover of a UE CSI-RS-based RSRP/RSRQ measurement reporting may be performed to implement configuration of a CoMP measurement set and ICIC. Thereby, accuracy of RRM and flexibility of the network may be enhanced.

Figure 9:
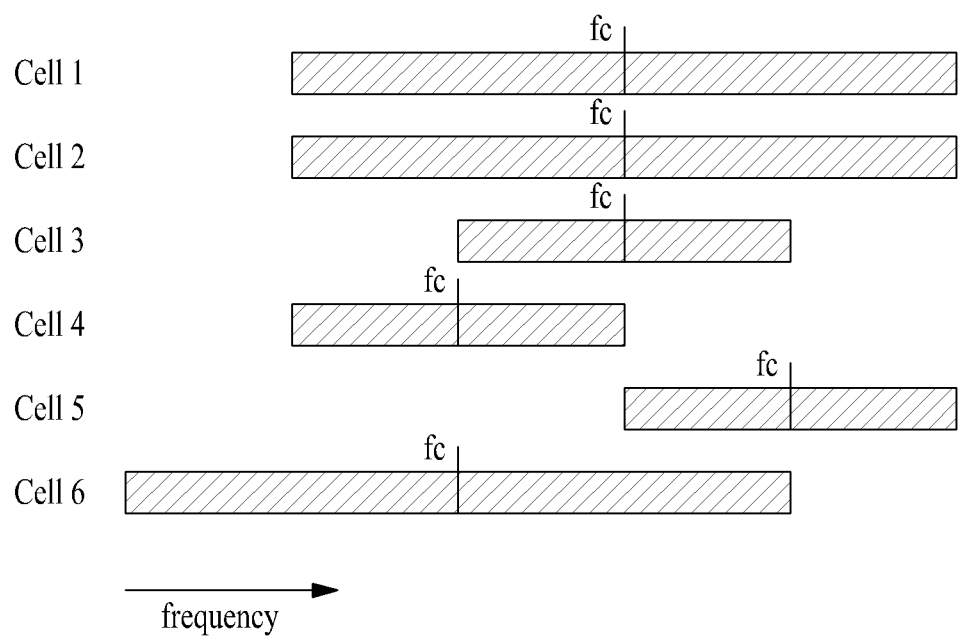
FIG. 9 is a diagram illustrating cells with heterogeneous bandwidths to which an embodiment of the present invention is applicable.

The cells in the aforementioned CoMP cluster generally have the same transmission center frequency and the same bandwidth, and thus coordinated transmission may be performed in the entire bandwidth of a serving cell to which the UE belongs. That is, cells having the same center frequency and the same bandwidth like cell 1 and cell 2 shown in FIG. 9 may constitute a CoMP cluster. In this case, there may be constraints related to flexibility of cell deployment. Accordingly, a CoMP cluster may be configured by i) cells having the same transmission center frequency and different bandwidth or ii) cells having different transmission center frequencies and different bandwidths such that coordinated transmission is performed. For example, in FIG. 9, cells 1 to 3 may constitute a CoMP cluster for coordinated transmission, or cells 1 and 4 to 6 may constitute a CoMP cluster for coordinated transmission. Such cells constituting a CoMP cluster are simply illustrative, and other CoMP clusters satisfying one of conditions i) and ii) given above can also be constituted. In a specific example of heterogeneous deployments, pico cells having a relatively small coverage and using a narrower bandwidth than a macro cell may be included in a CoMP cluster to allow for coordinated transmission (in this case, cost for a radio frequency (RF) of the pico cell may be reduced).

Meanwhile, when cells share one PCID, the UE cannot distinguish the cells from each other. Accordingly, in this case, the CoMP measurement set may be defined as a set of CSI-RSs transmitted from the respective cooperative cells, rather than as a set of cooperative cells. The UE is informed of multiple designated CSI-RS configurations and feeds back CSI for each or a part of the designated CSI-RS configurations. Accordingly, the CoMP measurement set includes CSI-RSs designated to feed back the results of CSI measurement.

Hereinafter, description will be given of a method for designating a CSI-RS for coordinated transmission and a CSI reporting method in the case of a CoMP cluster including i) cells having the same transmission center frequency and different bandwidth or ii) cells having different transmission center frequencies and different bandwidths, namely, cells having heterogeneous bandwidths.

CSI-RS Designation Scheme for Coordinated Communication with Heterogeneous Bandwidths When multiple CSI-RS resource configurations are sent to a UE to support coordinated communication between cells having heterogeneous bandwidths, each CSI-RS resource configuration may include information about a bandwidth for transmission of a CSI-RS according to the CSI-RS configuration. The multiple CSI-RS resource configurations to support coordinated communication between heterogeneous bandwidths may be for designation of a CoMP management set for RRM and a CoMP measurement set for CSI feedback. In addition, the bandwidth in which a CSI-RS is transmitted may be identical to a system bandwidth of a cell related to the CSI-RS. However, embodiments of the present invention are not limited thereto. The bandwidth in which a CSI-RS is transmitted may be a part of the system bandwidth of the cell related to the CSI-RS.

Information about such bandwidth may include i) the number of RBs, ii) the number of RBs and an RB offset, or iii) one of the start point and end point (in unit of RB) of the bandwidth. That is, each of the multiple CSI-RS configurations may not only include elements such as 'antennaPorts-Count', 'resourceConfig', and 'subframeConfig' shown in Table 3, but also information about the bandwidth. In this case, as the CSI-RS configurations are sent to the UE through radio resource control (RRC) signaling, the information about the bandwidth may also be sent to the UE through RRC signaling. However, embodiments of the present invention are not limited thereto. The information about the bandwidth may be sent to the UE in various ways as in a case in which CSI request contained in the DCI carries the information about the bandwidth.

In this case, the UE may measure RSRP/RSRQ for the entire CSI-RS transmission band. Alternatively, the UE may perform RSRP/RSRQ measurement only for a band corresponding to the smallest value of the CSI-RS transmission bandwidth and the bandwidth of the serving cell as the RSRP/RSRQ measurement bandwidth, in order to reduce reception complexity of the UE. Alternatively, the transmission bandwidth of each CSI-RS designated through RRC may be set to be less than or equal to the bandwidth of the serving cell (in this case, the UE may expect/assume that the transmission bandwidths of CSI-RSs for the UE are never set to be larger than the system bandwidth).

It has been described above that each of CSI-RS configurations related to the cells in a serving CoMP cluster contains information about a bandwidth on which a corresponding CSI-RS is transmitted. Contrary to the description, one (common) bandwidth on which CSI-RSs are transmitted may be delivered to the UE for the entirety of multiple CSI-RS resource configurations. Herein, the multiple CSI-RSs may belong to a CoMP management set.

In other words, the UE may be informed of only the smallest bandwidth of the multiple CSI-RS transmission bandwidths and RSRP/RSRQ of all CSI-RSs may be measured by the UE only for the smallest bandwidth. In this case, the UE may expect/assume that the measurement bandwidths of the designated CSI-RSs are never set to be larger than the system bandwidth.

This case may be applied not only to the serving CoMP cluster but also to a neighbor CoMP cluster.

More specifically, to allow for ICIC, the network and the UE need to identify a cell of the neighbor CoMP cluster that applies strong DL interference to the UE and a cell to which the UE applies strong UL interference. The UE performs CSI-RS-based RSRP measurement and reporting for the cells in the neighbor CoMP cluster. To this end, multiple CSI-RS resource configurations transmitted from the neighbor CoMP cluster may be indicated for the UE through RRC signaling. At this time, one bandwidth on which CSI-RSs are transmitted may be known to all the configurations. In this case, the UE is informed of only the smallest bandwidth of the multiple CSI-RS transmission bandwidths and transmission qualities of all the CSI-RSs are measured only for the smallest bandwidth and reported. Since measurement of multiple CSI-RSs is performed in consideration of only the CSI-RSs of a single band, complexity of the UE may be reduced.

The description of CSI-RS resource configurations given above has focused on the non-zero power (NZP) CSI-RSs for CSI measurement. A similar concept may be applied to zero power (ZP) CSI-RSs which are configured in order not to interfere with CSI-RS transmission in a neighbor cell.

In the case in which the CSI-RS transmission bandwidth of the neighbor cell is smaller than the system bandwidth of the serving cell and thus a CSI-RS of the neighbor cell is transmitted only in some bands, the serving cell may configure ZP CSI-RSs only for those bands in order not to interfere with the CSI-RS. In this case, the serving cell may designate and inform of a transmission bandwidth for every ZP CSI-RS resource. In addition, if transmission bandwidths of the NZP CSI-RS and the ZP CSI-RS are configured, data mapping may be performed excluding CSI-RS transmission REs. That is, if the NZP CSI-RS and the ZP CSI-RS are transmitted only in some bands or in some RBs, a smaller amount of data may be mapped in consideration of the CSI-RSs in the some bands or in the some RBs, and a larger amount of data may be mapped in the remaining RBs.

Figure 10:
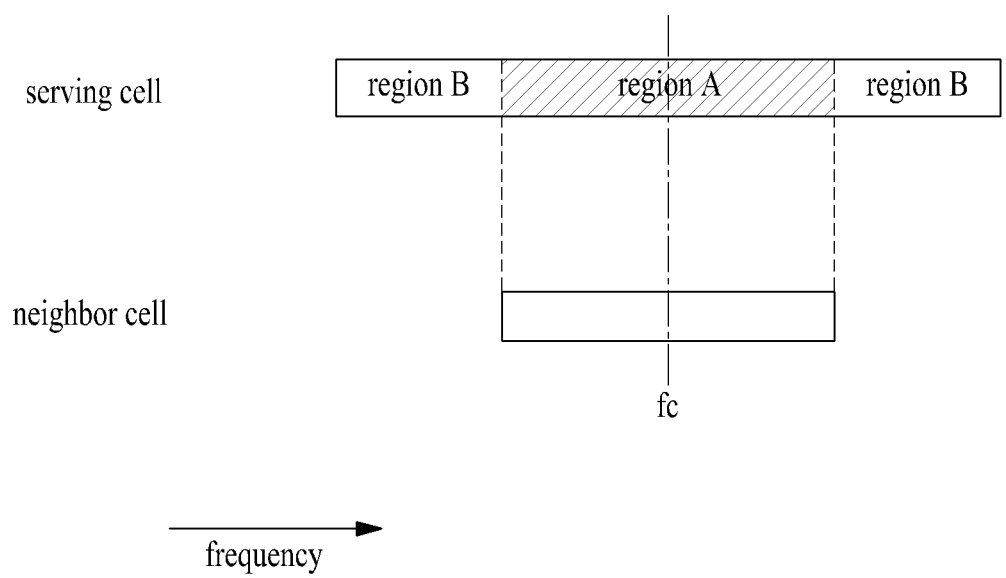
FIG. 10 is a diagram illustrating regions in which a serving cell may perform data mapping to which an embodiment of the present invention is applicable.

That is, referring to FIG. 10, the serving cell may configure a ZP CSI-RS only for region A corresponding to a frequency band of a neighbor cell. In addition, the serving cell may perform data mapping in region A such that an RE in which a CSI-RS is transmitted is avoided. Data mapping may be performed in region B regardless of ZP CSI-RS configurations.

In another method of data mapping, even if a NZP CSI-RS is transmitted in some bands, the NZP CSI-RS is assumed to be transmitted in the remaining bands as well, and thus data mapping may be performed in the entire bands such that data mapping is conducted in all the resource regions except REs depending on a corresponding CSI-RS. In this case, the UE may assume that a transmission bandwidth of a configured ZP CSI-RS remains identical to the system bandwidth, and the serving cell may not designate a separate transmission bandwidth for the ZP CSI-RS. The serving cell informs the UE of the designated transmission bandwidth for the NZP CSI-RS such that CSI-RS measurement is performed only in the corresponding region, and data mapping is configured over the entire band in the same manner.

If the CSI-RS transmission bandwidth of the neighbor cell is wider than the bandwidth of the serving cell (for example, in the case in which the UE having cell 3 configured as a serving cell is subjected to coordinated communication from cell 3 and cell 2 in FIG. 9, or the UE having cell 2 configured as a serving cell is subjected to coordinated communication from cell 2 and cell 6), the CSI-RS designation scheme for CSI feedback may employ one of the following operations.

First, the UE does not receive any signal in the regions other than the serving cell bandwidth, assuming that CSI-RS is not transmitted in those regions.

Second, an eNB informs of whether or not a CSI-RS is transmitted in a region other than serving cell bandwidth of the UE, and the UE receives the CSI-RSs even in this region, thereby improving the CSI-RS detection performance. However, bands other than the serving cell bandwidth are excluded for CSI feedback.

Third, eNB informs of whether or not a CSI-RS is transmitted in a region other than serving cell bandwidth of the UE, and the UE performs CSI-RS reception and detection in the bands including the region to recognize the channel state, and also feeds back CSI in the bands including the region.

In combination of or independently of the above descriptions, if cells of a CoMP cluster, which perform coordinated transmission have different center frequencies, the center frequencies of the cells and wheather carriers of the serving cell aligned with the frequencies are indicated to allow the UE to receive a CSI-RS from the neighbor cell. In the LTE/LTE-A system, in order to problems (e.g., peak average power ratio (PAPR)) of a DC carrier which occur in processing a base band on downlink in the transmission signal generation and reception processes, carriers corresponding to the center frequencies are excluded in defining RBs. Accordingly, when coordinated communication is performed without center frequencies of two cells equal to each other, all the RBs of one cell are not aligned with the RBs of the other cell, and they are aligned with a difference of 1 RE in some frequency bands. Alternatively, coordinated communication may be set to be performed between cooperative cells only when the center frequencies of two cells are aligned with each other.

Hereinafter, a description will be given of a CSI-RS sequence used according to each bandwidth in the case in which a CSI-RS is designated to support coordinated communication between cells having heterogeneous bandwidths.

Use of sequences in the conventional LTE/LTE-A system will be described first. Equation 1 related to generation of a CSI-RS sequence described above is given below again.

$$r_{l,n_s}(m) = \frac{1}{\sqrt{2}}(1-2\cdot c(2m)) + j\frac{1}{\sqrt{2}}(1-2\cdot c(2m+1)),$$
$$m = 0, 1, \ldots, N_{RB}^{max,DL}-1$$

Equation 1

Herein, the pseudo-random sequence c(i) is a gold code generated by combination between a fixed m-sequence and an m-sequence having a variable initial value $c_{init}$. The initial value $c_{init}$ is cell-specifically determined according to Equation 4 given below.

$$c_{init}=2^{10}\cdot(7\cdot(\text{mod}(n_s+\Delta_{n_s},20)+1)+l+1)\cdot(2\cdot X+1)+2\cdot X+N_{CP}$$

Equation 4

In Equation 4, $n_s$ denotes a slot index, l denotes an OFDM symbol index, $N_{CP}$ is a 1-bit flag determined depending on whether the CP is a normal CP or an extended CP. $N_{RB}^{max,DL}$ denotes the maximum number of RBs supported by a single component carrier and is set to 110. $\Delta_{n_s}$ and X have values determined by a subframe offset and a PCID of a cooperative neighbor cell in the coordinated transmission scheme, and the UE may be informed of the values through RRC signaling which designates multiple CSI-RS resource configurations.

In a system having a bandwidth less than 110 RBs, a middle portion of the CSI-RS sequence ($r_{l,n_s}(m)$, m=0, 1, . . . , 109) determined according the equations described above is taken and used according to the bandwidth agnostic principle for the LTE/LTE-A system. That is, $r_{l,n_s}(m)$ used for the 20 MHz, 10 MHz, and 5 MHz systems are $r_{l,n_s}(m)$ (m=5, 6, . . . , 53, 54, 56, . . . , 104), $r_{l,n_s}(m)$ (m=30, 31, . . . , 53, 54, 56, . . . , 79), and $r_{l,n_s}(m)$ (m=42, 43, . . . , 53, 54, 56, . . . , 66), respectively.

That is, a sequence of a length necessary for a bandwidth is used as the CSI-RS sequence with $r_{l,n_s}(54)$ and $r_{l,n_s}(55)$ at the center thereof according to the bandwidth agnostic principle. If the bandwidth agnostic principle is not employed, a sequence having a necessary length may be used with $r_{l,n_s}(0)$ set to the start of the sequence or with $r_{l,n_s}(109)$ set to the end of the sequence.

In consideration of a system which does not employ the bandwidth agnostic principle, when multiple CSI-RS resource configurations are designated for the UE through RRC signaling, the UE may be informed of the start point and end point of RBs in which a CSI-RS is transmitted for each configuration in order to support coordinated communication between cells having heterogeneous bandwidths.

In this case, the CSI-RS sequence may be set to $r_{l,n_s}(0)$ for the first RB in which the CSI-RS is transmitted, or set to $r_{l,n_s}(109)$ for the last RB in which the CSI-RS is transmitted, or may be mapped to an RB in which the CSI-RS is transmitted using a CSI-RS sequence index equal to the CSI-RS sequence index of the serving cell. That is, if the serving cell maps k-th value of the CSI-RS sequence to this RB, the CSI-RS of a cell other than the serving cell may also map k-th value $r_{l,n_s}(k)$ of the CSI-RS sequence to this RB.

On the contrary, in the case of a system employing the bandwidth agnostic principle, multiple CSI-RS resource configurations are designated for the UE through RRC signaling, the UE may be informed of the number of RBs in which the CSI-RS is transmitted and an RB offset for each configuration. In this case, a CSI-RS sequence on an RB at a position shifted by the RB offset may adopt a sequence having a length necessary for a bandwidth with $r_{l,n_s}(54)$ and $r_{l,n_s}(55)$ at the center thereof.

The UE may recognize an RB in which the CSI-RS is transmitted and a CSI-RS sequence on the RB through RRC signaling, and may perform CSI-RS reception and detection in the corresponding band using such information.

In addition, in the RRC signaling for designation of multiple CSI-RS configurations, the first CSI-RS configuration, which corresponds to the CSI-RS transmitted from the serving cell, may not be subjected to RRC signaling by setting X for generation of a scrambling code to the PCID of the serving cell, subframe offset $\Delta_{n_s}$ to '0', and the CSI-RS transmission bandwidth to the transmission bandwidth of the serving cell. Further, in designating a CoMP measurement set, the CSI-RS transmitted from the serving cell may always be involved.

CSI Feedback Scheme for Coordinated Communication with Heterogeneous Bandwidth

As described above, the CSI feedback scheme is broadly classified into a wideband CSI feedback scheme and a sub-band CSI feedback scheme. In the wideband CSI feedback scheme, a UE determines and feed back a rank, a precoding matrix, and a CQI to be used for DL data transmission in the full system band. On the other hand, in the sub-band CSI feedback scheme, the UE determines and feed back a preferred precoding matrix and/or a CQI for each sub-band to be adapted to a frequency selective fading environment. As shown in Table 4, the size of a sub-band is differently defined depending on the system bandwidth, i.e., the total number of RBs of a system. That is, a tradeoff between a gain of frequency selective scheduling and feedback overhead is considered according to the system bandwidth.

TABLE 4

| System bandwidth ($N_{RB}^{DL}$) | Sub-band size (k) |
| --- | --- |
| 6-7 | NA |
| 8-10 | 4 |
| 11-26 | 4 |
| 27-63 | 6 |
| 64-110 | 8 |

As described above, in the case in which CSI-RSs in a CoMP measurement set are provided with different transmission bandwidths to support coordinated communication between cells having heterogeneous bandwidths, a sub-band for CSI reporting may be configured as follows.

First, a sub-band size to be used in feeding back a result of estimation of a CSI-RS is determined according to the bandwidth of the CSI-RS. Thereby, when CSI for each CSI-RS in the CoMP measurement set is individually feed back, a sub-band size proper for each CSI-RS transmission bandwidth may be used. For example, referring to FIG. 11(a), it is assumed that the CSI-RS from cell 1 is transmitted on 100 RBs, and the CSI-RS from cell 2 is transmitted on 50 RBs. Therefore, according to Table 4, the sub-band size of 8 RBs is used in feeding back the CSI-RS of cell 1, and the sub-band size of 6 RBs is used in feeding back the CSI-RS of cell 2.

The first sub-band configuration method may cause difficulty in configuring dependency between CSI feedbacks when the CSI-RS in a CoMP measurement set have different transmission bandwidths, since defining the sub-bands according to transmission bandwidths of CSI-RSs for CSI feedback per CSI-RS causes the sub-bands for CSI feedback per CSI-RS to be in discord with each other. Particularly, in selecting and feeding back the best sub-band, the best band selected may not correspond to CSI feedback per CSI-RS.

In the second sub-band configuration method, the bandwidth of a serving cell may determine the bandwidths of the other CSI-RSs. In addition, the start time point of each sub-band may be set to correspond to that of a sub-band of the serving cell.

In consideration of the case in which the CSI-RS transmission band of a neighbor cell is wider than that of a serving cell, the sub-band size for sub-band CSI feedback is determined by the bandwidth of a CSI-RS having the largest (or smallest) transmission bandwidth. For example, referring to FIG. 11(b), it is assumed that the CSI-RS from cell 1 is transmitted on 100 RBs, the CSI-RS from cell 2 is transmitted on 50 RBs, and cell 1 is the serving cell of the UE. The UE may configure sub-bands for the two cells based on the bandwidth of cell 1, the serving cell. Therefore, according to Table 4, a sub-band size of 8 RBs may be used for feedback of the CSI-RSs from cell 1 and cell 2. To make the start position of the sub-band of cell 1 to correspond to the start position of the sub-band of cell 2, the size of the start sub-band of a lower and left side frequency for cell 2 is set to 7 RBs. In this case, the sizes of the sub-bands coincide with each other, but each CSI-RS has a different number of sub-bands. Accordingly, in periodic CSI reporting over a PUCCH, when CSI is fed back for a sub-band or a band part including multiple consecutive sub-bands, the position of a sub-band for feedback of a specific CSI-RS becomes different from that of a sub-band for feedback of another CSI-RS even if the CSI feedback periods for the CSI-RSs are set to correspond to each other. In order to efficiently perform coordinated transmission for a specific sub-band, it is important to feed back the CSI information in the same sub-band for all the CSI-RSs in a CoMP measurement set at the same time point or at neighboring time points. Therefore, in consideration of a CSI-RS having the greatest number of sub-bands, CSI of the same sub-band is sequentially reported such that CSI of all the CSI-RSs for the same sub-band is fed back at neighboring time points. That is, in FIG. 11(b), since cell 1 has a greater number of sub-bands, CSI of cell 2 may be fed back according to the feedback period and time point of cell 1. More specifically, as shown in FIG. 11(b), indexing is performed from the lower frequency region of cell 1 in the order of sb 1, sb 2, and the like such that sub-band CSI is sequentially fed back. Since a CSI-RS is not transmitted from cell 2 for sub-band indexes sb 1, sb 2, and sb 3, CSI information is not transmitted at the time point of CSI feedback of cell 2 associated with the time point of CSI feedback of those sub-bands, and CSI about sub-bands of cell 2 is fed back at the CSI feedback time point of cell 2 associated with the CSI feedback time point for sub-band indexes sb 4 to sb 10 of cell 1.

In addition, in the case in which the sub-band feedback scheme is classified into various types, when a type associated with a type of feedback of individually feeding back results of channel estimation from CSI-RSs is selectively used, the sub-band may be differently defined among the feedback types.

Third, in the CSI-RS transmission and CSI feedback schemes for coordinated communication between cells with heterogeneous bandwidths, a virtual bandwidth may be used to configure sub-bands. That is, the widest transmission bandwidth of the transmission bandwidths of CSI-RSs belonging to a CoMP measurement set may be defined as a virtual transmission bandwidth of the other CSI-RSs, and the number and size of the sub-bands for CSI feedback may be set based on this virtual bandwidth. At this time, for a cell having no CSI-RS in a sub-band, CSI may not be fed back at the CSI feedback time point of the cell, but may be dropped.

Figure 12:
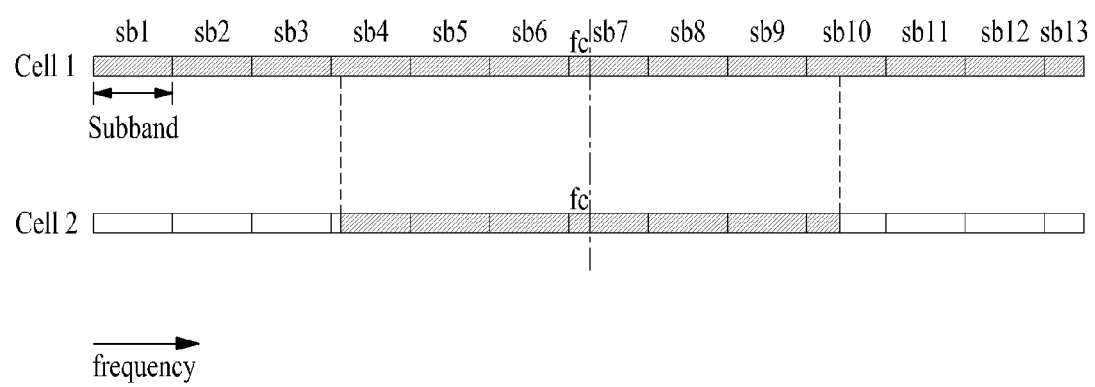

FIG. 12 exemplarily shows two bandwidths for cells 1 and 2. Based on the bandwidth of cell 1 which is wider than that of cell 2, the size and number of virtual sub-bands may be set. The size and number of the virtual sub-bands configured as above are applied to cells associated with other CSI-RSs (i.e., bandwidths of the cells or transmission bandwidths of CSI-RSs transmitted from the cells). In performing reporting for each sub-band, the UE may consider whether or not CSI reporting is performed in a virtual sub-band for other cells in relation to coordinated transmission among the sub-bands of the cell for the virtual bandwidth. For example, in FIG. 12, when the UE performs reporting for cell 1 and cell 2 according to each sub-band, reporting is performed only for cell 1 in sub-bands sb 1 to sb3 (sb 11 to sb 13), and CSI may be sequentially reported for both cell 1 and cell 2 in sub-bands sb 3 to sb 10.

The proposed techniques of the present invention have been described, focusing on the LTE/LTE-A system. The proposed techniques may also be applied to other communication standards when properly varied. According to embodiments of the present invention, when RSs for channel estimation are designated for a UE to support coordinated communication between cells having heterogeneous bandwidths, transmission bandwidths and RS sequence mapping offsets are individually designated for each RS. In addition, the sub-band size for sub-band CSI feedback is determined in consideration of each CSI-RS transmission bandwidth.

Figure 13:
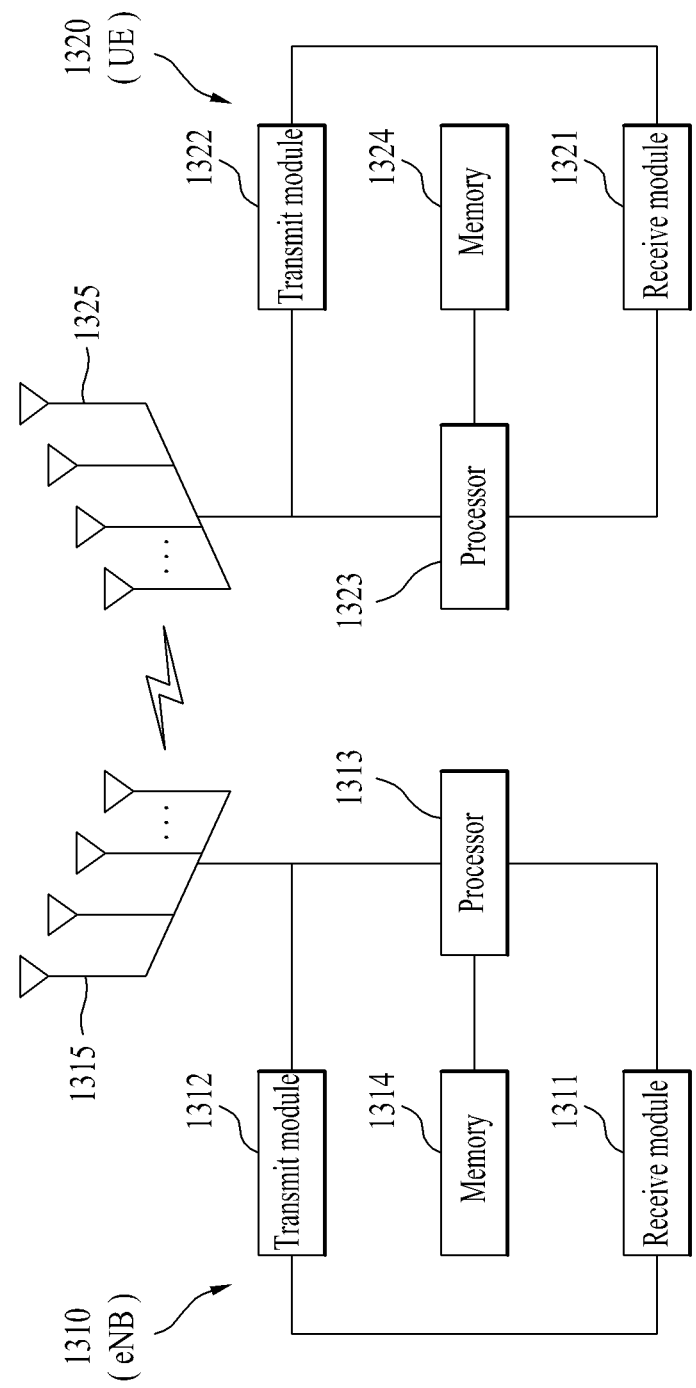
FIG. 13 is a diagram illustrating configurations of transceivers.

FIG. 13 is a diagram illustrating configurations of an eNB and a UE according to one embodiment of the present invention.

Referring to FIG. 13, an eNB 1310 may include a receive module 1311, a transmit module 1312, a processor 1313, a memory 1314, and a plurality of antennas 1315. The antennas 1315 represent an eNB that supports MIMO transmission and reception. The receive module 1311 may receive various signals, data and information from a UE on uplink. The transmit module 1312 may transmit various signals, data and information to a UE on downlink. The processor 1313 may control overall operation of the eNB 1310.

The processor 1313 of the eNB 1310 according to one embodiment of the present invention may operate to implement the embodiments described above.

Additionally, the processor 1313 of the eNB 1310 may function to operationally process information received by the eNB 1310 or information to be transmitted from the eNB 1310, and the memory 1314, which may be replaced with an element such as a buffer (not shown), may store the processed information for a predetermined time.

Referring to FIG. 13, a UE 1320 may include a receive module 1321, a transmit module 1322, a processor 1323, a memory 1324, and a plurality of antennas 1325. The antennas 1325 represent a UE that supports MIMO transmission and reception. The receive module 1321 may receive various signals, data and information from the eNB on downlink. The transmit module 1322 may transmit various signals, data and information to the eNB on uplink. The processor 1323 may control overall operation of the UE 1320.

The processor 1323 of the UE 1320 according to one embodiment of the present invention may perform operations necessary for implementation of the embodiments described above.

Additionally, the processor 1323 of the UE 1320 may function to operationally process information received by the UE 1320 or information to be transmitted from the UE 1320, and the memory 1324, which may be replaced with an element such as a buffer (not shown), may store the processed information for a predetermined time.

The configurations of the eNB and the UE as described above may be implemented such that the above-described embodiments are independently applied or two or more thereof are simultaneously applied, and description of redundant parts is omitted for clarity.

Description of the eNB 1310 in FIG. 13 may be equally applied to a relay as a downlink transmitter or an uplink receiver, and description of the UE 1320 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to have the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to have the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention as described above are applicable to various mobile communication systems.

The invention claimed is:

1. A method for transmitting information for at least one of measurement reporting and channel state information (CSI) reporting of a user equipment (UE) by a serving cell performing coordinated multipoint (CoMP) transmission with heterogeneous bandwidths in a wireless communication system, the method comprising:

transmitting, to the UE, the information for CSI reporting comprising information on a CSI-reference signal (CSI-RS) transmission bandwidth; and receiving CSI for each sub-band determined based on a sub-band size;

wherein the sub-band size is determined based on the CSI-RS transmission bandwidth, wherein the information for the CSI reporting comprises a CSI-RS configuration, wherein the CSI-RS configuration comprises the information on the CSI-RS transmission bandwidth, and wherein the CSI-RS transmission bandwidth corresponds to a common bandwidth in which a bandwidth for each of the serving cell and a cooperating cell having different transmission center frequencies or different transmission bandwidths to transmit CSI-RS is overlapped.

2. The method according to claim 1, wherein the information on the CSI-RS transmission bandwidth comprises a number of resource blocks.

3. The method according to claim 1, wherein the CSI-RS transmission bandwidth is identical to a bandwidth used by a cell associated with the CSI-RS.

4. The method according to claim 1, wherein the CSI-RS configuration is for designating at least one of a CoMP management set and a CoMP measurement set.

5. The method according to claim 1, wherein, when the serving cell transmits a zero power CSI-RS for the cooperating cell, the zero power CSI-RS is transmitted in a bandwidth corresponding to the CSI-RS transmission bandwidth of the cooperating cell.

6. The method according to claim 5, wherein the serving cell considers a zero power CSI-RS configuration only when data mapping is performed in a bandwidth corresponding to the CSI-RS transmission bandwidth of the cooperating cell.

7. A method for reporting channel state information (CSI) to a serving cell performing coordinated multipoint (CoMP) transmission with heterogeneous bandwidths by a user equipment (UE) in a wireless communication system, the method comprising:

receiving, from the serving cell, information for the CSI reporting comprising information on a CSI-reference signal (CSI-RS) transmission bandwidth;

determining a sub-band size based on the CSI-RS transmission bandwidth; and reporting CSI for each sub-band determined based on the sub-band size, wherein the information for the CSI reporting comprises a CSI-RS configuration, wherein the CSI-RS configuration comprises the information on the CSI-RS transmission bandwidth, and wherein the CSI-RS transmission bandwidth corresponds to a common bandwidth in which a bandwidth for each of the serving cell and a cooperating cell having different transmission center frequencies or different transmission bandwidths to transmit CSI-RS is overlapped.

8. The method according to claim 7, wherein the sub-band size determined based on the CSI-RS transmission bandwidth is applied to a bandwidth related to at least one CSI-RS to report the CSI.

9. The method according to claim 8, wherein, when there are two or more CSI-RS configurations to report the CSI, the UE reports sub-bands corresponding to each other in bandwidths corresponding to the two or more CSI-RS configurations.

10. The method according to claim 7, wherein the information related to the CSI-RS transmission bandwidth comprises a number of resource blocks.

11. The method according to claim 7, wherein the CSI-RS transmission bandwidth is identical to a bandwidth used by a cell associated with the CSI-RS.

12. The method according to claim 7, wherein the CSI-RS configuration is for designating at least one of a CoMP management set and a CoMP measurement set.

13. A base station for performing coordinated multipoint (CoMP) transmission with heterogeneous bandwidths in a wireless communication system, the base station comprising:

a transmit module; and a processor configured to:

transmit, via the transmit module, information for channel state information (CSI) reporting comprising information on a CSI-reference signal (CSI-RS) transmission bandwidth to a user equipment (UE), and receive, via the transmit module, CSI for each sub-band determined based on a sub-band size, wherein the sub-band size is determined based on the CSI-RS transmission bandwidth, wherein the information for the CSI reporting comprises a CSI-RS configuration, wherein the CSI-RS configuration comprises the information on the CSI-RS transmission bandwidth, and wherein the CSI-RS transmission bandwidth corresponds to a common bandwidth in which a bandwidth for each of the serving cell and a cooperating cell having different transmission center frequencies or different transmission bandwidths to transmit CSI-RS is overlapped.

14. A user equipment (UE) for reporting channel state information (CSI) to a serving cell performing coordinated multipoint (CoMP) transmission with heterogeneous bandwidths in a wireless communication system, the UE comprising:

a receive module;

a transmit module; and a processor configured to:

receive, via the receive module, information for the CSI reporting comprising information on a CSI-reference signal (CSI-RS) transmission bandwidth from the serving cell, determine a sub-band size based on the CSI-RS transmission bandwidth, and report, via the transmit module, CSI for each sub-band determined based on the sub-band size, wherein the information for channel state information reporting comprises a channel state information-reference signal (CSI-RS) configuration, wherein the CSI-RS configuration comprises the information on the bandwidth for transmission of a CSI-RS transmission bandwidth, and wherein the CSI-RS transmission bandwidth corresponds to a common bandwidth in which a bandwidth for each of the serving cell and a cooperating cell having different transmission center frequencies or different transmission bandwidths to transmit CSI-RS is overlapped.

* * * * *